(12) United States Patent
Morita et al.

(10) Patent No.: US 7,369,295 B2
(45) Date of Patent: May 6, 2008

(54) ELECTROCHROMIC DISPLAY

(75) Inventors: Satoshi Morita, Tottori (JP); Takao Yamauchi, Tottori (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 11/345,435

(22) Filed: Jan. 31, 2006

(65) Prior Publication Data

US 2006/0170665 A1    Aug. 3, 2006

(51) Int. Cl.
*G02F 1/153* (2006.01)

(52) U.S. Cl. .................. 359/267; 359/269; 359/271; 359/273

(58) Field of Classification Search ......... 359/265–275
See application file for complete search history.

(56) References Cited

U.S. PATENT DOCUMENTS 5,847,860 A * 12/1998 Hougham et al. .......... 359/267

FOREIGN PATENT DOCUMENTS

| | | |
|---|---|---|
| EP | 84604 | 10/1982 |
| JP | 58-129468 | 8/1983 |
| JP | 59-91423 | 5/1984 |
| JP | 59-91424 | 5/1984 |
| JP | 2001-188263 | 7/2001 |
| JP | 2001-264823 | 9/2001 |
| JP | 2003-149688 | 5/2003 |
| JP | 2004-518159 | 6/2004 |
| WO | WO 02/056106 | 7/2002 |

* cited by examiner

*Primary Examiner*—Evelyn A. Lester
(74) *Attorney, Agent, or Firm*—SoCal IP Law Group LLP; Steven C. Serebolf; John E. Gunther (57) ABSTRACT

An electrochromic display is disclosed which comprises an array side substrate (10) on which a pixel electrode (15) and an electrochromic layer (30) are formed, a color filter side substrate (50) on which a counter electrode (53) and an electrochromic layer (54) are formed, and an electrolytic layer (80) injected between the array side substrate (10) and the color filter side substrate (50). By forming the pixel electrode (15) of a reflective electrode material, it becomes unnecessary to add a coloring agent in the electrolytic layer (80) for enhancing contrast and therefore the electrolytic layer (80) can be made thin.

17 Claims, 9 Drawing Sheets

ELECTROCHROMIC DISPLAY

This application is a national stage application claiming priority to Application No. PCT/JP2004/010630, filed Jul. 26, 2004, which claims priority to Japanese Application No. JP2003-284039, filed Jul. 31, 2003.

BACKGROUND

1. Field

The present invention relates to an electrochromic display that displays images by utilizing an electrochromic phenomenon.

2. Description of the Related Art

Electronic paper is getting more and more attention as a new display medium that combines the characteristics as paper, which is no need of information holding energy, can be securely saved, easily read, quickly readable and so on, and the characteristics as an electronic display capable of rewriting information and so on.

Various types are known as a display principle in the electronic paper. For example, it is a microcapsule type electrophoretic display method where capsules enclosing positively and negatively charged black and white particles are moved between electrodes. Further, it is a twist ball method where the direction of spherical particles colored in black and white are controlled. These methods perform display by utilizing a physical phenomenon.

On the other hand, there is known a method that performs display by utilizing a chemical phenomenon. Among others, one utilizing an electrochromic phenomenon is known where voltage is applied between electrodes to cause coloring or deletion by oxidation-reduction reaction. This is described in Japanese Patent Laid-Open No. 10-232413 publication, for example.

In the case of an electrochromic display utilizing the electrochromic phenomenon, it is constituted that electrodes are formed on each of substrates that make a pair, an electrochromic film is formed on the electrodes, and an electrolytic layer is sandwiched between the both substrates. Coloring agent such as white particles is usually contained in the electrolytic layer for improving contrast. However, the coloring agent is contained in the electrolytic layer at a fixed ratio and target contrast cannot be secured when the electrolytic layer is made too thin, and manufacturing of a thin electrochromic display is thus limited to a certain level.

SUMMARY OF THE INVENTION

Consequently, it is an object of the present invention to provide an electrochromic display that can be manufactured even thinner.

To solve the above-described problems, the electrochromic display of the present invention is characterized by including: one substrate on which pixel electrodes are formed; a plurality of pixels each of which is made up of a counter electrode, an electrochromic layer and an electrolytic layer which are formed between the pixel electrode and the counter electrode, in which outside light reflection means is formed on the one substrate.

Further, the present invention is characterized in that the pixel electrode combines the outside light reflection means. Furthermore, the present invention is also characterized in that the pixel electrode is provided on the surface of the outside light reflection means directly or via an insulation film.

Still further, the invention is characterized in that the surface of the pixel electrode is in an uneven shape. Then, the invention is characterized in that the thickness of the electrolytic layer is 5 to 50 µm.

DETAILED DESCRIPTION

In the following, description will be made for embodiments to implement the present invention based on the drawings. The embodiments show an electrochromic display of about 8 inches to 10 inches and having a pixel pitch of 80 to 100 µm.

Embodiment 1

Figure 1:
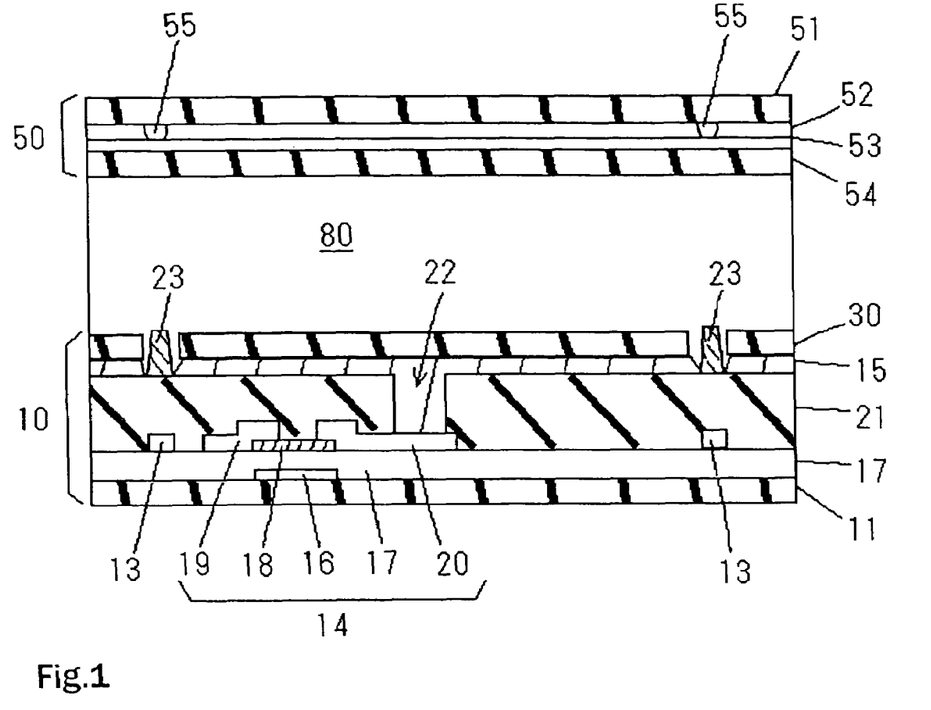
FIG. 1 shows a cross-sectional schematic view of a pixel of an electrochromic display of an embodiment of the present invention.
Figure 2:
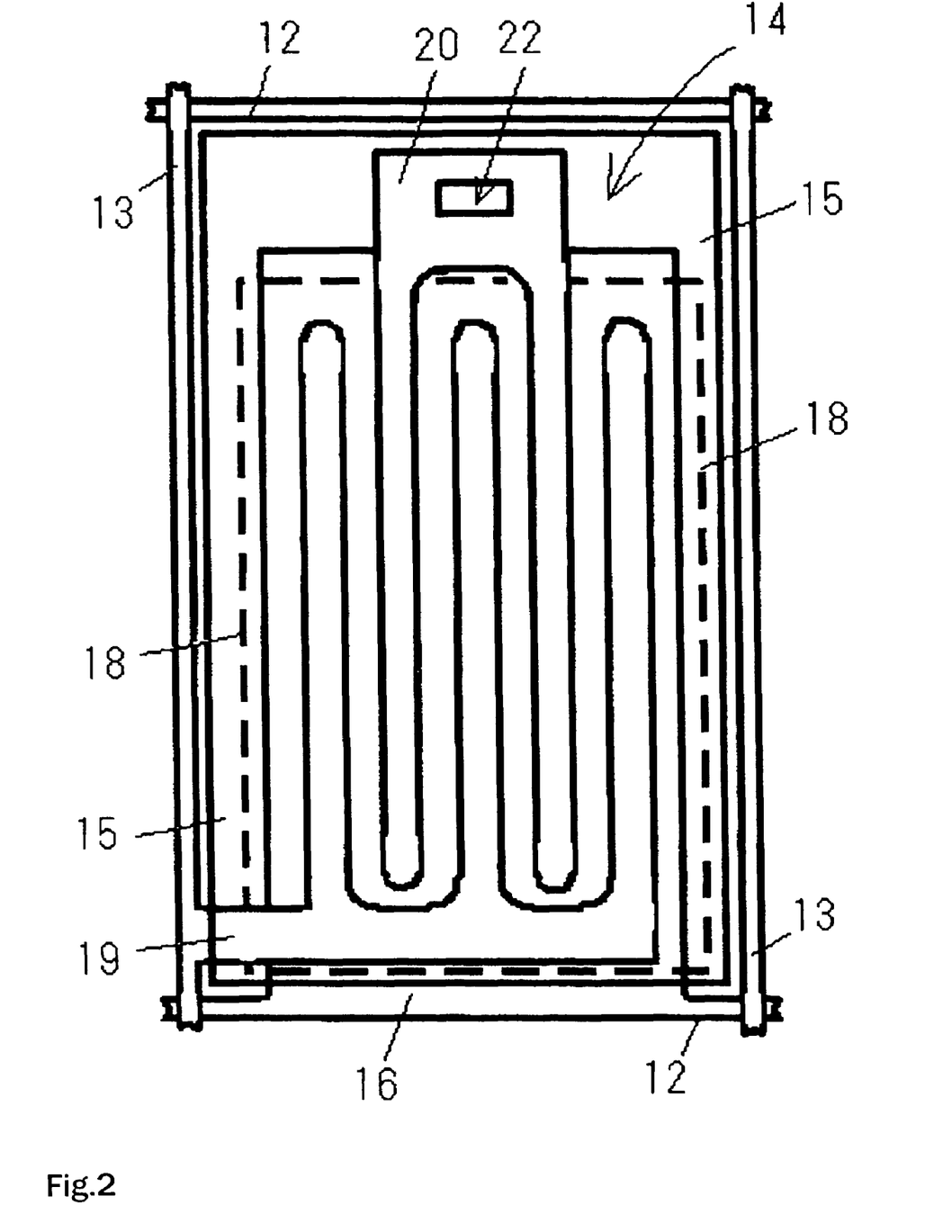
FIG. 2 shows a plan view of a pixel in an electrochromic display of an embodiment of the present invention.
Figure 3:
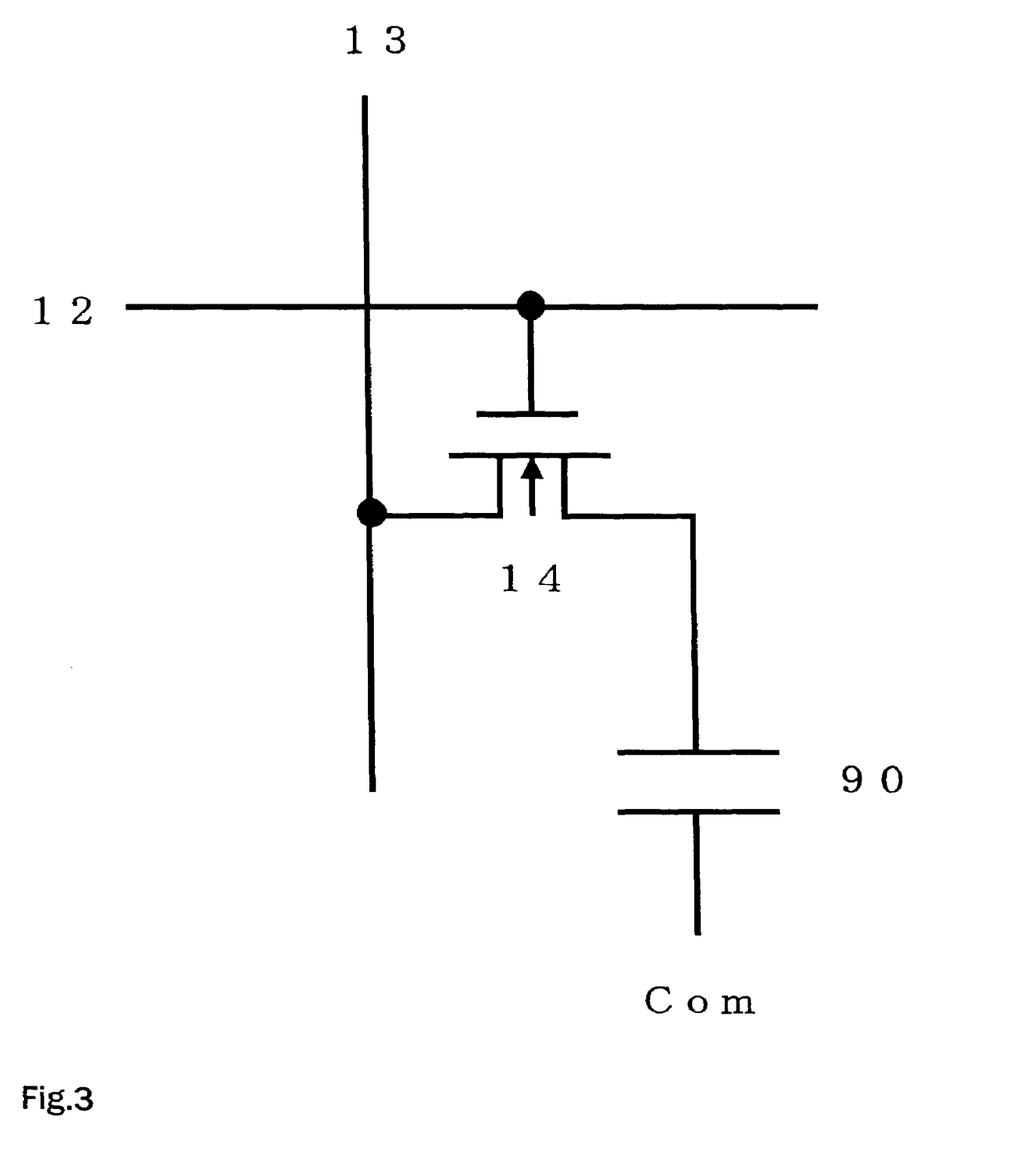
FIG. 3 shows a circuit diagram of a pixel in an electrochromic display of an embodiment of the present invention.

FIG. 1 shows the cross-sectional schematic view of a pixel in an electrochromic display of Embodiment 1, FIG. 2 shows the plan view of the pixel, and FIG. 3 is a view schematically showing the circuit diagram of the pixel. Note that FIG. 1 and FIG. 2 has different size, shape and the like of each constituent element.

The electrochromic display is constituted by an array-side substrate 10, a color filter-side substrate 50, and an electrolytic layer 80 sandwiched between the both substrates.

In the array-side substrate 10, a plurality of gate wires 12 and a plurality of source wires 13 are wired in a matrix state on a glass substrate 11. A region surrounded by the gate wires 12 and the source wires 13 corresponds to one pixel. A switching TFT 14, a pixel electrode 15 connected to the TFT 14, and an electrochromic layer 30 stacked on the pixel electrode 15 are formed on each pixel. It is preferable that the thickness of the electrochromic layer 30 be about 3 to 10 µm, and 3 to 4 µm more preferably.

A plurality of the gate wires 12 are formed on the glass substrate 11 by stacking Al and Mo. Further, the gate electrode 16 of the TFT 14 is simultaneously formed when forming the gate wires 12 (not shown in FIG. 1). The gate electrode 16 has a size having about 65% of one pixel area, as shown in FIG. 2, and its shape is in an oblong rectangular shape approximately similar to the shape of the pixel. It is preferable that the switching TFT 14 be capable of flowing as large current as possible when it is turned to ON state for the purpose of performing oxidation-reduction reaction. Therefore, the gate electrode 16 is formed as large as possible.

A gate insulation film 17 made of $SiN_x$ is stacked on the glass substrate 11, and the gate insulation film 17 covers the gate wires 12 and the gate electrode 16. An amorphous silicon (hereinafter, referred to as a-Si) layer is stacked on the gate insulation film 17, and only a part of the layer that falls in the semiconductor layer 18 of the TFT 14 is left by a photolithography method (shown in a broken line in FIG. 2). At this point, the semiconductor layer 18 is in a shape covering a major part of the gate electrode 16.

A metal layer where Al and Mo are stacked is formed on the gate insulation film 17 and the semiconductor layer 18, the metal layer is patterned by the photolithography method to form the source wires 13, the source electrode 19 and the drain electrodes 20 of the TFT 14. At this point, the source wires 13 are provided orthogonal to the gate wires 12, and the source electrodes 19 are protruded from the source wires 13 at an area near the crossing portion with the gate wire 12.

The periphery of the source electrode 19 is in a shape taken along the periphery of the gate electrode 16 and also in a shape having U-shaped concave portions extending along the source wires 13, and it is in a shape having two concave portions in FIG. 2. The drain electrode 20 is in a shape having thin and long rod-shaped convex portions that are located between the U-shaped concave portions of the source electrode 13, and has two convex portions so as to correspond to the concave portions of the source electrode 19.

It is preferable that the switching TFT 14 be capable of flowing as large current as possible when it is turned to ON state for the purpose of performing oxidation-reduction reaction. Particularly, the TFT 14 using a-Si in the semiconductor layer 18 has difficulty of allowing current to flow therein comparing to a TFT using polysilicon despite advantages such as easiness of manufacturing comparing to the TFT using polysilicon, so it is necessary to make the TFT 14 as large as possible. Although a channel length may be shorter and a channel width may be wider in order to allow current to flow more smoothly, making the TFT 14 as large as possible to widen the channel width is more effective because there is a limitation on manufacturing engineering in shortening the channel length. The size of TFT may be no less than half the area of one pixel region, more preferably it may be no less than 60% of the area.

Consequently, the shapes of the source electrode 19 and the drain electrode 20 are devised to allow current to flow as much as possible between source/drain when the TFT 14 becomes ON state. Specifically, the gate electrode 16 of the TFT 14 is formed in an oblong rectangular shape corresponding to the shape of the pixel to make the source electrode 19 and the drain electrode 20 long, and the channel width can be wider in a limited space. Further, by providing the U-shaped concave portions in the source electrode 19 and arranging the drain electrode 20 between the concave portions, the source electrode 19 is located on the both sides of the drain electrode 20 to make the channel width become twice, and thus the channel width can be made larger effectively in a small space.

An insulation film 21 is formed so as to cover the source wires 13 and the TFT 14. Meanwhile, although not shown, the insulation film 21 consists of two layers where a lower layer is formed of inorganic insulation film such as $SiN_x$ and an upper layer is formed of organic insulation film such as photosensitive acrylic resin. Then, countless concavity and convexity (not shown) are formed on the organic insulation film. The reason why the concavity and convexity are formed on the surface of the insulation film 21 is to form a pixel electrode reflection type electrochromic display that reflects outside light on the pixel electrode 15 by using a reflective electrode material made of metal for the material of the pixel electrode 15 (described later) to utilize the pixel electrode 15 itself as the outside light reflection means.

In the case of a general electrochromic display, coloring agent is contained in the electrolytic layer 80 in order to improve contrast. White particles for coloring are used in the coloring agent, and inorganic particles of calcium oxide, magnesium oxide, titanium dioxide or the like are specifically cited. In using such inorganic particles, they must be mixed into the electrolytic layer 80 at a fixed ratio. Further, in using such electrolytic layer 80, certain thickness of the electrolytic layer 80 is required because good contrast cannot be secured if the electrolytic layer 80 is made thin too much. Furthermore, when the electrolytic layer 80 is made thinner, there is a danger that short circuit will occur between the array-side substrate 10 and the color filter-side substrate 50 due to the inorganic particles.

However, since the pixel electrode reflection type electrochromic display does not have the danger of the above-described problem, a gap between the array-side substrate 10 and the color filter-side substrate 50 can be made narrower. In addition, the size and the application of the electrochromic display are often limited in a way to electronic books, advertisement on the street, or the like, and an observing position in such a case is also limited in a way. Therefore, it is better to enhance contrast in a specific direction rather than securing a wide view angle by using coloring agent or the like. Consequently, by using the pixel electrode reflection type electrochromic display in which the concavity and convexity are provided on a pixel electrode surface and a reflecting direction of light is focused in a fixed direction, contrast in an arbitrary direction can be enhanced. It is preferable that the tilt angle of the concavity and convexity formed on the pixel electrode surface be about 7° to 15° in order to focus light in a fixed direction, and it is set to 10° in this embodiment.

In an area that does not overlap the semiconductor layer 18 of the drain electrode 20, a contact hole 22 is formed in the insulation film 21. Further, a reflective electrode material made of Al is stacked on the insulation film 21, the reflective electrode material is patterned by the photolithography method to form the pixel electrode 15. Ag or Al is specifically preferable for the reflective electrode material from the viewpoint of reflection efficiency, conductivity, or the like. The drain electrode 20 of the TFT 14 is connected to the pixel electrode 15 via the contact hole 22. The surface of the pixel electrode 15 becomes uneven due to the effect of the insulation film 21 located under the electrode. Further, the area of the pixel electrode 15 is slightly smaller than the area of one pixel, and a region that can be used for display and a region capable of reflecting light are made wider by increasing the area of the pixel electrode 15. The end portions of the pixel electrode 15 may be partially overlapped with the gate wire 12 or the source wire 13 when seen on a plan view as long as they do not contact an adjacent pixel electrode 15.

Short circuit prevention means for preventing adjacent pixel electrodes 15 and adjacent electrochromic layers 30 from short-circuiting with each other is provided around the pixel electrode 15. It is specifically a partition wall 23 formed so as to surround the pixel electrode 15. The partition wall 23 is formed of Novolac resin on the insulation film 21 on the gate wires 12 and the source wires 13. Its height is approximately the same as or higher than the thickness of the electrochromic layer 30, which is about 3 to 10 μm. For example, when the electrochromic layer 30 is formed by screen printing (described later), it is preferable that the height of the partition wall be approximately the same height as the thickness of the electrochromic layer, and it is desirable that the height of the partition wall be higher than the height of the electrochromic layer 30 when it is formed by a so-called ink jet method. When higher definition display needs to be performed, the size of one pixel becomes smaller, a gap between pixels becomes narrower, and there is a danger of causing short circuit of the pixel electrode 15 with adjacent pixels. Particularly, with advance of even higher definition in future, a distance between adjacent pixels, that is, the distance between the pixel electrode 15 and the pixel electrode 15 in this case becomes about 5 μm to 30 μm, and there is a higher chance of causing short circuit.

However, by providing the short circuit prevention means in this manner, short circuit among adjacent pixel electrodes 15 can be prevented, and the electrochromic layer 30 formed on the pixel electrode 15 is prevented from short-circuiting with an adjacent electrochromic layer 30. Note that the partition wall 23 may be any type as long as it is an insulator, and it may be formed of organic resin or inorganic resin other than Novolac resin. Further, as the short circuit prevention means other than the partition wall 23, a groove may be formed in the insulation film 21 at a boundary area to an adjacent pixel, for example.

The electrochromic layer 30 is formed in a region on the pixel electrode 15, which is surrounded by the partition wall 23. As the electrochromic layer 30, one that is made of a material indicating coloring and erasing by electrochemical oxidation or reduction reaction and used in a general electrochromic display may be used. For example, tungsten oxide, titanium oxide, molybdenum oxide, iridium oxide, nickel oxide, vanadium oxide, tin nitride, indium nitride, polythiophene, polypyrrole, metal phthalocyanine, viologen and the like are cited. Alternatively, one having a nano-particle thin film state material as described in International Publication No. 97/35227 or the like may be used. By using a nano-particle thin film state material, oxidation-reduction reaction can be accelerated to increase display response speed or to improve contrast. The nano-particle thin film state material is used in this embodiment as well, and a nano-particle thin film made of $SnO_2$ to which Sb is doped is specifically used in this embodiment.

Although the electrochromic layer 30 may be directly formed on the pixel electrode 15 by a widely known method such as a vacuum evaporation method and a sputtering method, for example, nano particles made of $SnO_2$ to which Sb is doped are formed first on each pixel electrode 15 by a screen printing method in the forming method of the nano-particle thin film in this embodiment. Productivity can be improved by the screen printing method. Further, since the partition wall 23 surrounding the periphery of the pixel electrode 15 is formed, it is possible to form the nano-particle thin film highly accurately on the pixel electrode 15 by utilizing the partition wall 23. Particularly, when the forming method of the nano-particle thin film is done by the screen printing method, the height, area or the like of the nano-particle thin film can be formed very accurately in a space formed by the partition wall 23 on the pixel electrode 15. Then, after performing a process such as sintering the nano-particle thin film and allowing the film to adsorb oxidized or reduced compound, the electrochromic layer 30 is formed.

In a color filter-side substrate 50, a color filter 52 provided corresponding to each pixel, a counter electrode 53, and an electrochromic layer 54 stacked on the counter electrode 53 are formed on a glass substrate 51.

Black matrix 55 is formed on the glass substrate 51 so as to sectionalize each pixel, and the color filter 52 corresponding to each pixel is formed at the opening of the black matrix 55. The color filter 52 consists of three colors of red (R), green (G) and blue (B), for example, and one color out of the three colors is arranged corresponding to each pixel. The counter electrode 53 made of ITO (Indium-Tin-Oxide) or IZO (Indium-Zinc-Oxide), for example, is stacked on the color filter 52.

The electrochromic layer 54 is formed on the counter electrode 53. The electrochromic layer 54 is formed by a layer formed of the nano-particle thin film similar to the array-side substrate 10. A nano-particle thin film made of $TiO2$ is specifically used in this embodiment. After forming the nano-particle thin film on the counter electrode 53, the electrochromic layer 54 is formed after performing a process such as sintering the nano-particle thin film or allowing the film to adsorb oxidized or reduced compound. Then, the array-side substrate 10 and the color filter-side substrate 50 are arranged in a facing manner.

The electrolytic layer 80 serves a role to carry charge by ions contained in solvent. As the electrolytic layer 80, one used in a general electrochromic display may be used, and its constituent material and forming method are not particularly limited. It also may be a liquid electrolytic layer, a gel system electrolytic layer, or a solid system electrolytic layer.

Solvent into which electrolyte is dissolved can be used as the liquid electrolytic layer. As specific solvent, water, propylene carbonate, ethylene carbonate, γ-butyrolactone and the like are cited. As specific electrolyte, sulfuric acid, hydrochloric acid and the like are cited as acids, and sodium hydroxide, potassium hydroxide, lithium hydroxide or the like is cited as alkalis. As salts, inorganic ion salt, quaternary ammonium salt, cyclic quaternary ammonium salt or the like of alkaline (earth) metal salt such as lithium perchlorate, sodium perchlorate and silver perchlorate is cited.

As the gel system electrolyte, one produced by mixing and polymerizing acetonitrile, ethylene carbonate, propylene carbonate or their mixture with polymer such as polyacrylonitrile and polyacrylamide is specifically cited.

As the solid system electrolyte, polymer side chain such as polyethyleneoxide having salt such as sulfone imide salt, alkylimidazolium salt and tetra-cyanoquinodimethane salt is cited.

When the electrolytic layer 80 is the liquid electrolytic layer, a sealing material is coated on the peripheral portion of the array-side substrate 10 or the color filter-side substrate 50. The sealing material is coated so as to form an injection port for injecting the material of the electrolytic layer 80. Then, the both substrates are bonded together, and the material of the electrolytic layer 80 is injected into a fixed gap generated between the both substrates via the injection port. Note that the sealing material is coated such that the fixed gap generated between the both substrates becomes the layer thickness of the electrolytic layer 80 (described later). Further, as an injection method of the material of the electrolytic layer 80, a widely known method such as a vacuum injection method may be used, for example.

The thickness of the electrolytic layer 80 is between about 5 μm and about 50 μm, and it is preferably between about 7 μm and about 30 μm. If the thickness of the electrolytic layer 80 becomes too thick, there is a danger that an observer will recognize even the display state of an adjacent pixel through one pixel when he/she observes the display state, so it is preferable that the thickness of the electrolytic layer 80 be as thin as possible. On the contrary, if the thickness of the electrolytic layer 80 becomes too thin, its role may become insufficient, the array-side substrate 10 may highly likely short-circuit with the color filter-side substrate 50 due to a foreign object, or a problem on manufacturing engineering is considered, so that the above-described layer thickness is appropriate.

Although not shown in the electrochromic display of Embodiment 1, spherical spacers are sprayed on the array-side substrate 10. Thus, the thickness of the electrolytic layer 80 can be maintained at a fixed thickness over the entire electrochromic display, stable display can be performed, and the spraying can be performed easier than forming columnar spacers on the array-side substrate 10. Regarding the number of the spherical spacers, it is not necessary to allow spacers to exist in several numbers per one pixel like spherical spacers for strictly controlling a cell gap in a liquid crystal display, for example, but they may be sprayed in one spacer per a plurality of pixels. Therefore, the spherical spacers rarely affect display.

In the electrochromic display, a gate wire drive circuit and a source wire drive circuit (both are not shown) for selecting each pixel are respectively provided at the end portion side of the gate wire 12 and the end portion side of the source wire 13, and a signal control section (not shown) for controlling the gate wire drive circuit and the source wire drive circuit is provided. The gate wire drive circuit controlled by the signal control section applies a gate signal to a predetermined gate wire 12. The gate signal is applied to the gate electrode 16 of the switching TFT 14 to turn the TFT 14 to ON state. The source signal applied to a predetermined source wire 13 is applied from the source electrode 19 of the TFT 14 to the pixel electrode 15 via the drain electrode 20, and display is performed by a display element 90.

FIG. 4, FIG. 5, FIG. 6, FIG. 7 and FIG. 8 schematically show circuit diagrams of the electrochromic display of Embodiment 1. Note that the same reference numerals are applied to the same parts as those of FIG. 3.

Figure 4:
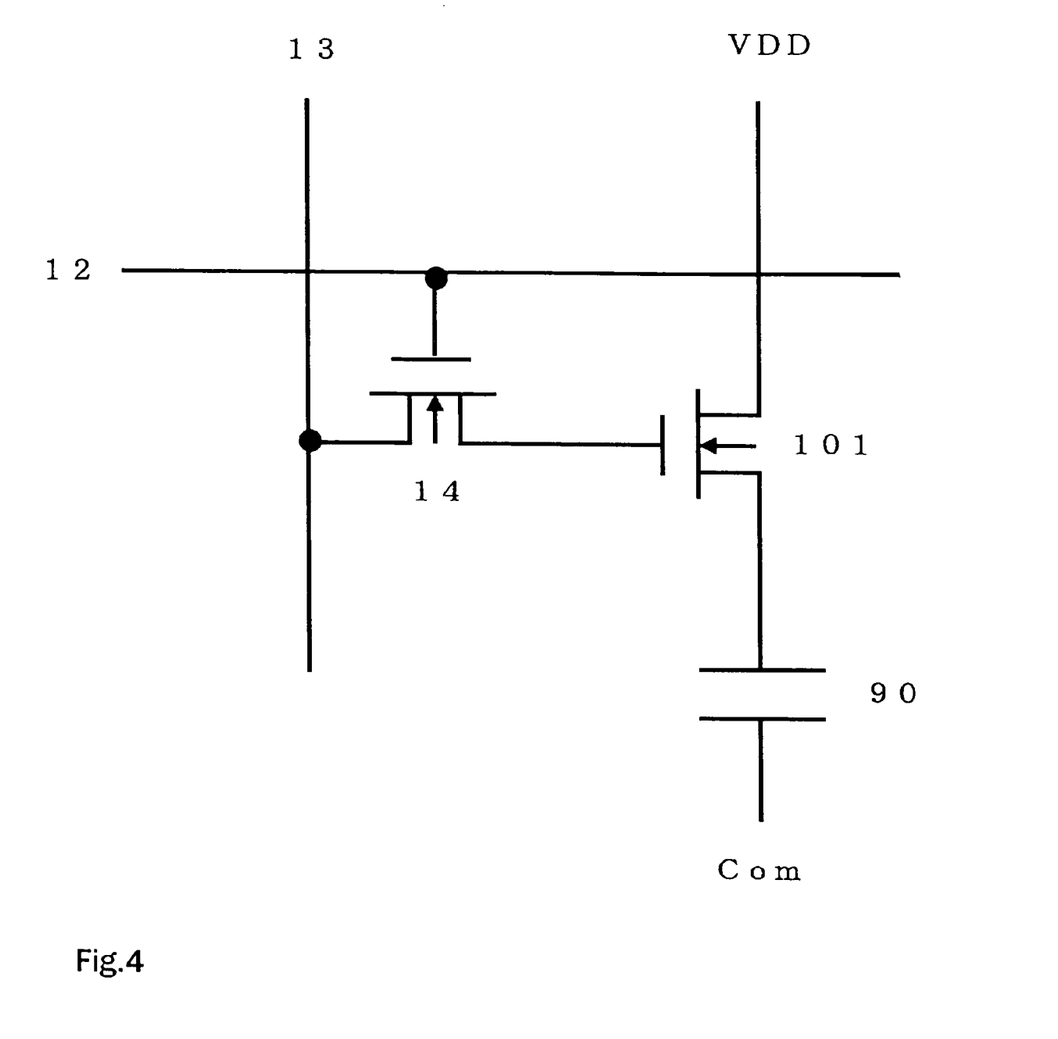
FIG. 4 shows a circuit diagram of a pixel in another embodiment.

FIG. 4, unlike FIG. 3 where display is performed by a voltage drive circuit, is a display performing display by a current drive circuit. In addition to the switching TFT 14, a power supply wire (Vdd) formed along the source wire 13 and a TFT 101 for supplying current to the display element 90 from the power supply wire (Vdd) are formed in each pixel. The gate electrode, the source electrode and the drain electrode of the TFT 101 are respectively connected to the drain electrode 20 of the TFT 14, the power supply wire (Vdd) and the display element 90.

Such current drive circuit can supply larger current to the display element 90 than the one in FIG. 3, and oxidation-reduction reaction can be proceeded at higher speed. In the case of this embodiment, power supply sorted in two types such as 10V for black display and 0V for white display should be performed to the power supply wire (Vdd). Further, a frame rate gradation method is suitable when performing gradation display.

Meanwhile, both the TFT 14 and the TFT 101 are formed of an N-type TFT, that is, a TFT using electrons as carriers, so that a-Si can be used for the semiconductor layer, and they can be formed in the same process. Further, it is not necessary to form the power supply wire (Vdd) along the source wire 13, but may be formed along the gate wire 12, and the power supply wire may be formed in any direction as long as it can supply power to each pixel.

Figure 5:
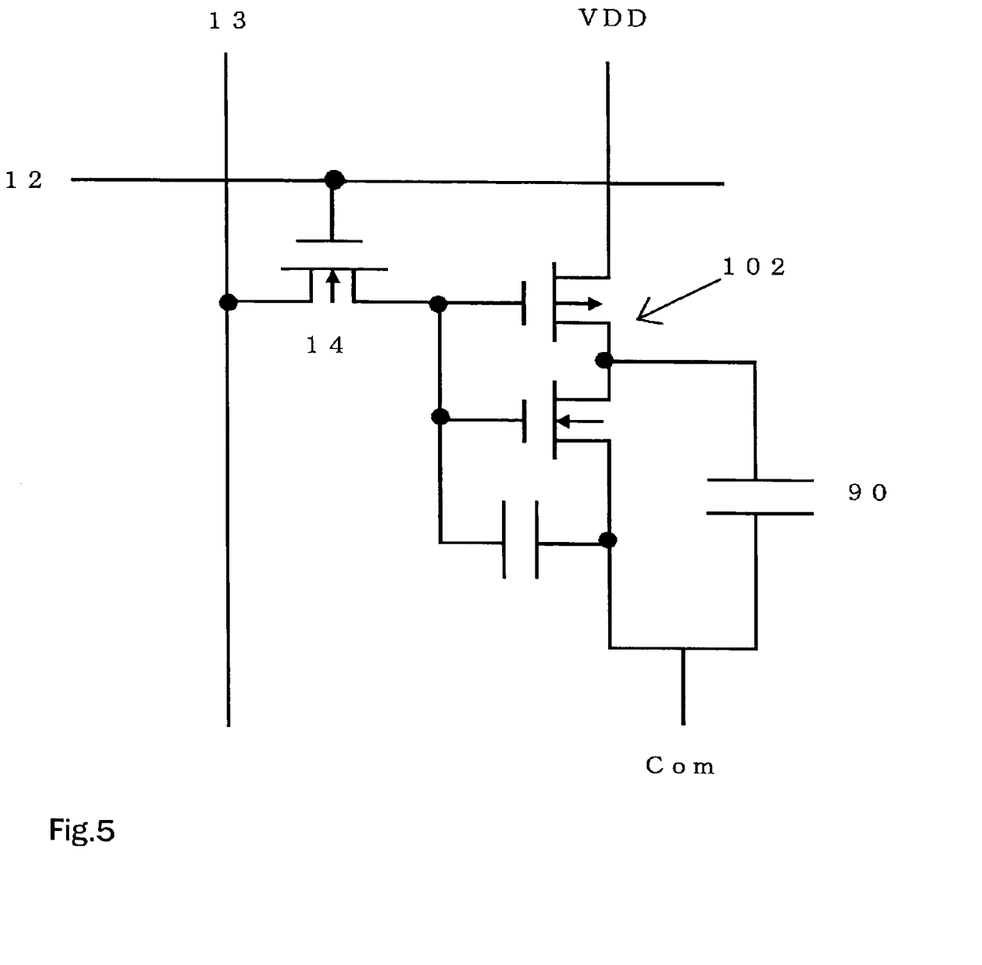
FIG. 5 shows a circuit diagram of a pixel in another embodiment.

FIG. 5 shows the current drive circuit as shown in the above-described embodiment, where switching means and potential control means are provided for each pixel. Specifically, an N-type switching TFT 14 is used as the switching means and CMOS 102 made up of a P-type TFT and an N-type TFT is used as the potential control means. The input terminal of the CMOS 102 is connected to the drain electrode 20 of the TFT 14, and the output terminal of the CMOS 102 is connected to the display element 90. With this, oxidation-reduction reaction can be proceeded at higher speed, and gradation display by a voltage gradation method also can be performed by the potential control means. Meanwhile, since the CMOS 102 is used in this embodiment, polysilicon will be used in the semiconductor layer of the TFT. Accordingly, it exerts effects such that power consumption is reduced and peripheral drive circuits can be formed integrally. Furthermore, the semiconductor layer 18 of the switching TFT 14 can be formed by polysilicon as well.

Figure 6:
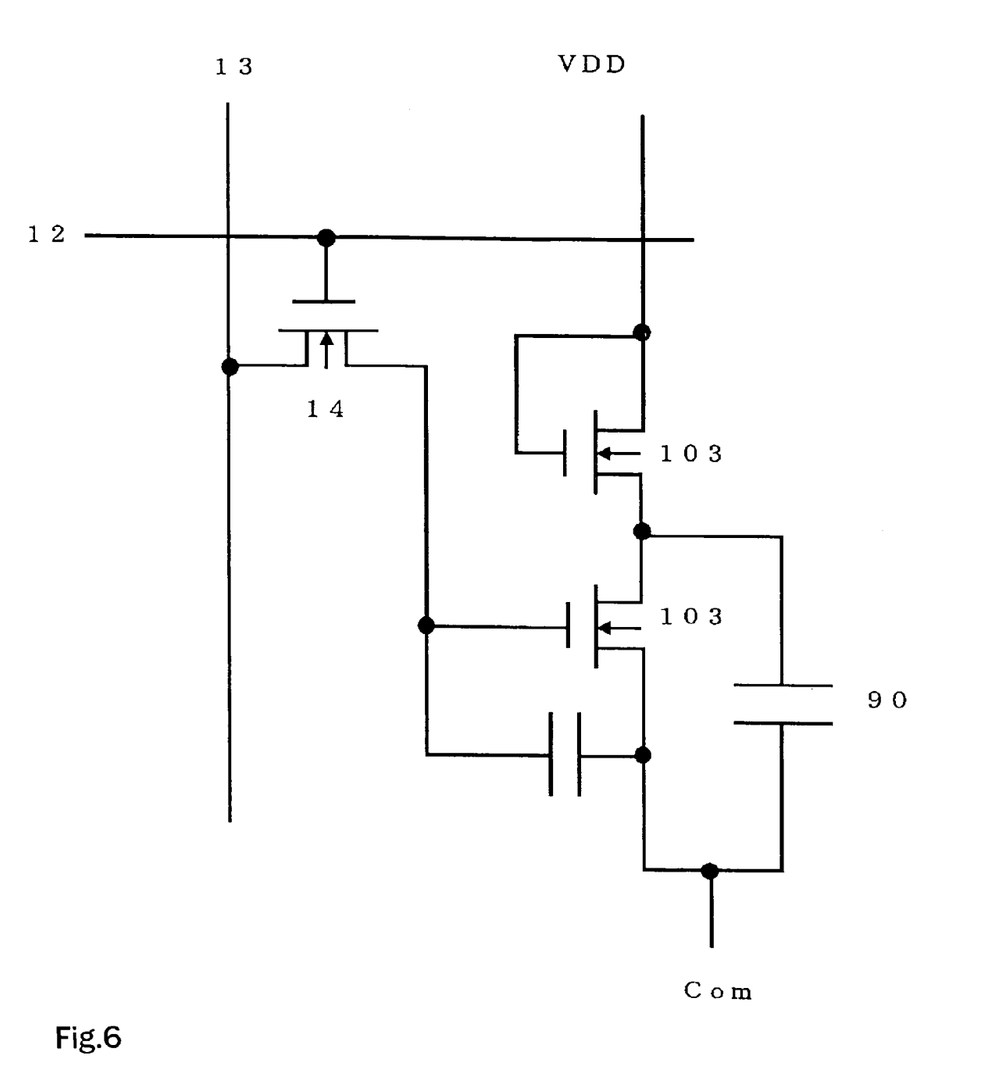
FIG. 6 shows a circuit diagram of a pixel in another embodiment.

FIG. 6 shows the circuit where the switching means and the potential control means are provided in each pixel in the same manner as FIG. 5. What is different from FIG. 5 is that it uses two of P-type or N-type TFTs 103 as the potential control means instead of the CMOS 102 (the figure shows N-type TFT). Therefore, the semiconductor layer of the TFTs can be manufactured by using a-Si without using polysilicon, and thus an effect such as easiness of manufacturing is exerted. Since all the TFTs formed for each pixel are N-type TFTs, a-Si may be used in their semiconductor layers, so that the increase of manufacturing processes can be suppressed comparing to the case where P-type and N-type TFTs are mixed in each pixel.

Figure 7:
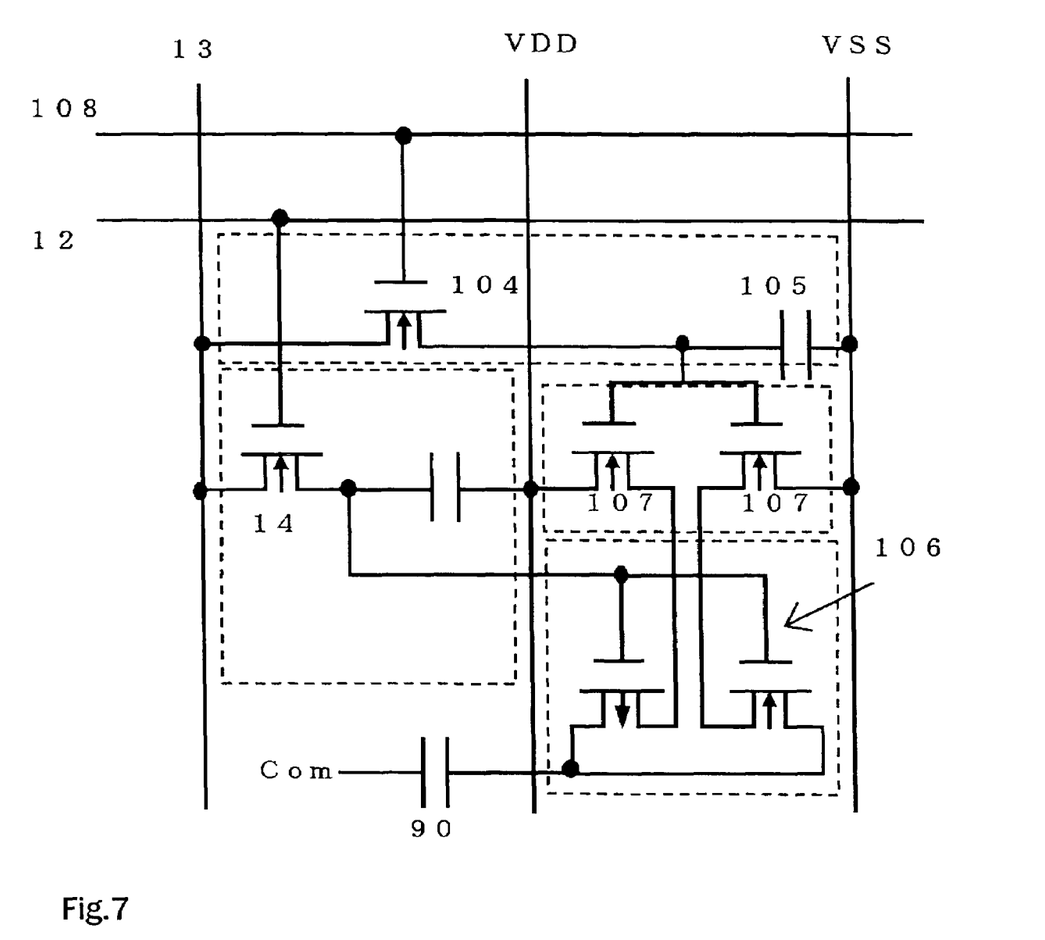
FIG. 7 shows a circuit diagram of a pixel in another embodiment.

FIG. 7 shows a circuit where switching means, rewrite specifying means, potential control means and power source breaking means are provided for the current drive circuit of the above-described embodiment. Specifically, the switching TFT 14 is used as the switching means, an N-type TFT 104 and a capacitor 105 are used as the rewrite specifying means, CMOS 106 is used as the potential control means, and two N-type TFTs 107 are used as the power breaking means. The gate electrode of the TFT 104 is connected to a word wire 108 traveling parallelly with the gate wire 12, the source electrode of the TFT 104 is connected to the source wire 13, and the drain electrode of the TFT 104 is connected to the capacitor 105 and gate electrodes of the TFTs 107. The source electrodes of the TFTs 107 are severally connected to either one of the two power supply wires (Vdd)(Vss). The drain electrodes of the TFTs 107 are severally connected to either one of the P-type TFT and N-type TFT which constitute the CMOS 106, the input terminal of the CMOS 106 is connected to the drain electrode 20 of the TFT 14, and the output terminal of the CMOS 106 is connected to the display element 90. Consequently, in each pixel selected by the word wire 108 and the source wire 13, whether or not rewrite is necessary is specified, power is supplied to a pixel specified as one that needs to be rewritten, and power is not supplied to a pixel specified as one that does not need to be rewritten.

Since the electrochromic display has a so-called memory capability of display, if the display of corresponding pixels is the same as the one in the previous pixel selection, power consumption is reduced when such display is maintained as it is. Consequently, by providing the rewrite specifying means and the power blocking means for each pixel, the rewrite specifying means specifies that no rewrite is needed and the power blocking means blocks supply of power if there is no change between the display state in the previous selection and the display state of the current selection. The rewrite specifying means specifies that rewrite is needed and the power blocking means does not block supply of power if there is a change between the display state in the previous selection and the display state of the current selection. With this method, power consumption in the electrochromic display can be reduced. Note that polysilicon will be used in the semiconductor layers of the TFTs because the CMOS 106 is also used in this embodiment.

Figure 8:
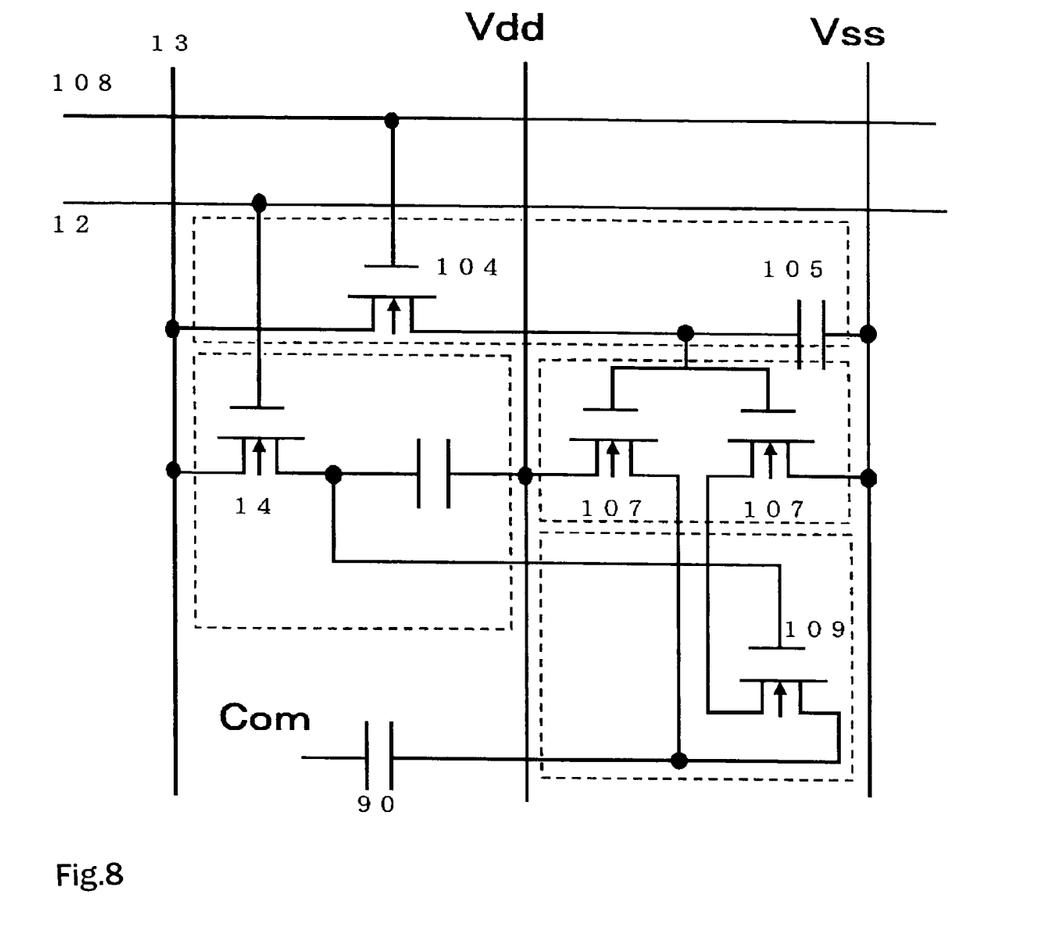
FIG. 8 shows a circuit diagram of a pixel in another embodiment.

FIG. 8 shows a current drive circuit where the switching means, the rewrite specifying means, the potential control means and the power source breaking means are provided in each pixel similar to FIG. 7. What is different from FIG. 7 is that a P-type or an N-type TFT 109 is used as the potential control means instead of the CMOS 106 (the figure shows N-type). Therefore, the semiconductor layer of the TFTs can be manufactured by using a-Si without using polysilicon, and thus an effect such as easiness of manufacturing is exerted. Since all the TFTs formed for each pixel are N-type TFTs, a-Si may be used in their semiconductor layers, so that the increase of manufacturing processes can be suppressed comparing to the case where P-type and N-type TFTs are mixed in each pixel.

Meanwhile, the power supply wires (Vdd)(Vss) are shown in the circuit diagrams shown in FIG. 4 to FIG. 8, and the end portions of the power supply wires are connected to the power source. In this case, there is a danger that power supply capability will reduce as they become further from the power source due to wiring resistance. Therefore, the both ends of the power supply wire may be connected to the power source or adjacent power supply wires are connected to each other via one or more connection points to prevent the power supply capability from being reduced. In such a case, when the connection points are formed in a ladder shape, power can be supplied even if one wire out of the power supply wires is broken.

Embodiment 2

Figure 9:
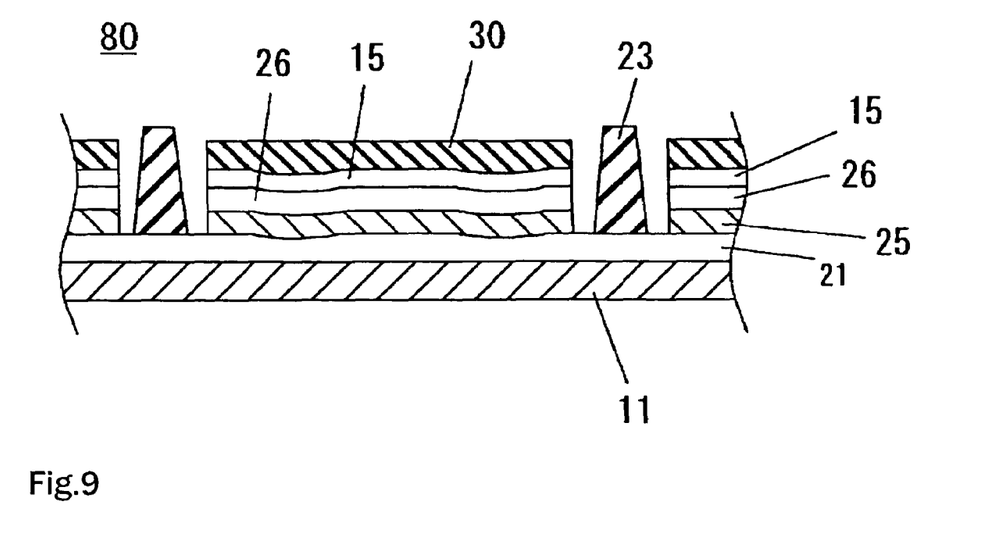
FIG. 9 is a schematic cross-sectional view of a pixel in still another embodiment.

FIG. 9 shows the schematic cross-sectional view of a pixel of the electrochromic display of Embodiment 2. The pixel electrode 15 is formed by the reflective electrode material and the pixel electrode itself forms the outside light reflection means in the electrochromic display of Embodiment 1, but the electrochromic display of Embodiment 2 is characterized in that the pixel electrode 15 and a reflection layer 25 forming the outside light reflection means are provided in a separate manner.

Specifically, as shown in FIG. 9, the electrochromic display of Embodiment 2 has a constitution that an insulation film 21 made of inorganic insulation film such as $SiN_x$ and the reflection layer 25 made of Al, Ag or the like are sequentially stacked on the glass substrate 11, the pixel electrode 15 made of a transparent conductive material such as ITO (Indium-Tin-Oxide) and IZO (Indium-Zinc-Oxide) via an insulation film 26 made of $SiN_x$ or the like is further stacked on the reflection layer 25, and the electrochromic layer 30 is stacked on the pixel electrode 15. Note that reference numeral 23 denotes a partition wall.

There is a danger that the reflection layer 25 will be corroded by the electrolytic layer 80 depending on the material of the reflection layer 25. Particularly, the reflection layer 25 is highly likely corroded by the electrolytic layer 80 when Al is used. However, with the above-described constitution, the reflection layer 25 is covered by the insulation film 26 and the pixel electrode 15 and it does not contact the electrolytic layer 80 directly, so that it is not corroded even when Al is used for the reflection layer 25 and an inexpensive electrochromic display can be manufactured. Particularly, although the reflection layer 25 may be simply covered by the pixel electrode 15 in order to prevent the reflection layer 25 from directly contacting the electrolytic layer 80, the pixel electrode 15 itself is not so thick due to the material used for the electrode, which is about 1000 Å in this embodiment. So, corrosion of the reflection layer 25 can be prevented more securely by providing a thick insulation film 26 (about 2500 Å in this embodiment) between the reflection layer 25 and the pixel electrode 15.

In this case, concavity and convexity may be provided on the reflection layer 25 as shown in the drawing and the reflection direction of light is focused in a fixed direction to enhance contrast in a particular direction. Meanwhile, the pixel electrode 15 is electrically conductive with the drain electrode 20 (refer to FIG. 1) by providing a contact hole appropriately, and the reflection layer 25 itself may be or may not be electrically conductive with the drain electrode 20.

Note that other modes than the above-described embodiments within the range of the gist of the present invention can be realized. For example, other insulative substrates such as a plastic substrate may be used other than the glass substrate 11. Furthermore, the insulative substrate may be film state having flexibility.

In the electrochromic display, which includes one substrate on which pixel electrodes are formed, and a plurality of pixels each of which is made up of a counter electrode, said pixel electrode, an electrochromic layer and an electrolytic layer, the outside light reflection means is formed on the one substrate, so that it is unnecessary to allow the electrolytic layer to contain the coloring agent for enhancing contrast, the electrolytic layer can be made thin, and thus an even thinner electrochromic display can be provided.

It is claimed:

1. An electrochromic display comprising:
   a first substrate
   a second substrate
   a plurality of pixels each comprising
      a pixel electrode disposed on the first substrate
      a counter electrode disposed on the second substrate
      an electrochromic layer disposed between the pixel electrode and the counter electrode
      an electrolytic layer disposed between the pixel electrode and the counter electrode and having a thickness of less than 50 μm
      wherein each pixel electrode has a surface having an uneven shape.

2. The electrochromic display of claim 1, wherein the surface has a concavity and convexity with a tilt angle of 7° to 15°.

3. An electrochromic display comprising:
   a first substrate
   a second substrate
   a plurality of pixels each comprising
      a pixel electrode disposed on the first substrate
      a counter electrode disposed on the second substrate
      an electrochromic layer disposed between the pixel electrode and the counter electrode
   an electrolytic layer disposed between the pixel electrode and the counter electrode and having a thickness of less than 50 μm,
   wherein each pixel electrode comprises a reflector for reflecting outside light, wherein each pixel electrode is made of any one of Al and Ag.

4. An electrochromic display comprising:
   a first substrate
   a second substrate
   a plurality of pixels each comprising
      a pixel electrode disposed on the first substrate a counter electrode disposed on the second substrate
an electrochromic layer disposed between the pixel electrode and the counter electrode
an electrolytic layer disposed between the pixel electrode and the counter electrode and having a thickness of less than 50 μm
further comprising, for each pixel electrode, a reflector for reflecting outside light and an insulation film disposed between the pixel electrode and the reflector.

5. The electrochromic display of claim 4, wherein the reflector has a surface with an uneven shape.

6. The electrochromic display of claim 4, wherein the reflector has a surface having a concavity and convexity with a tilt angle of 7° to 15°.

7. An electrochromic display comprising:
a first substrate
a second substrate
a plurality of pixels each comprising
a pixel electrode disposed on the first substrate
a counter electrode disposed on the second substrate
an electrochromic layer disposed between the pixel electrode and the counter electrode
an electrolytic layer disposed between the pixel electrode and the counter electrode and having a thickness of less than 50 μm, wherein the electrolytic layer consists of a liquid electrolytic layer.

8. An electrochromic display comprising:
a first substrate
a second substrate
a plurality of pixels each comprising
a pixel electrode disposed on the first substrate
a counter electrode disposed on the second substrate
an electrochromic layer disposed between the pixel electrode and the counter electrode
an electrolytic layer disposed between the pixel electrode and the counter electrode
a reflector for the pixels disposed on the first substrate, wherein the reflector comprises a plurality of reflective elements respectively included in the pixel electrodes.

9. The electrochromic display of claim 8, wherein the electrolytic layer has a thickness of 5 to 50 μm.

10. An electrochromic display comprising:
a first substrate
a second substrate
a plurality of pixels each comprising
a pixel electrode disposed on the first substrate
a counter electrode disposed on the second substrate
an electrochromic layer disposed between the pixel electrode and the counter electrode
an electrolytic layer disposed between the pixel electrode and the counter electrode
a reflector for the pixels disposed on the first substrate, wherein each pixel electrode has a surface having an uneven shape.

11. The electrochromic display of claim 10, wherein each pixel electrode has a surface having a concavity and convexity with a tilt angle of 7° to 15°.

12. An electrochromic display comprising:
a first substrate
a second substrate
a plurality of pixels each comprising
a pixel electrode disposed on the first substrate
a counter electrode disposed on the second substrate
an electrochromic layer disposed between the pixel electrode and the counter electrode
an electrolytic layer disposed between the pixel electrode and the counter electrode
a reflector for the pixels disposed on the first substrate, wherein each pixel electrode is disposed on the reflector.

13. An electrochromic display comprising:
a first substrate
a second substrate
a plurality of pixels each comprising
a pixel electrode disposed on the first substrate
a counter electrode disposed on the second substrate
an electrochromic layer disposed between the pixel electrode and the counter electrode
an electrolytic layer disposed between the pixel electrode and the counter electrode
a reflector for the pixels disposed on the first substrate, wherein an insulation film is disposed between the pixel electrode and the reflector.

14. The electrochromic display of claim 13, wherein the reflector has a surface with an uneven shape.

15. An electrochromic display comprising:
a first substrate
a second substrate
a plurality of pixels each comprising
a pixel electrode disposed on the first substrate
a counter electrode disposed on the second substrate
an electrochromic layer disposed between the pixel electrode and the counter electrode
an electrolytic layer disposed between the pixel electrode and the counter electrode
a reflector for the pixels disposed on the first substrate, wherein the reflector comprises a plurality of reflective elements each having a surface having a concavity and convexity with a tilt angle of 7° to 15°.

16. An electrochromic display comprising:
a first substrate
a second substrate
a plurality of pixels each comprising
a pixel electrode disposed on the first substrate
a counter electrode disposed on the second substrate
an electrochromic layer disposed between the pixel electrode and the counter electrode
an electrolytic layer disposed between the pixel electrode and the counter electrode
a reflector for the pixels disposed on the first substrate, wherein the electrolytic layer consists of a liquid electrolytic layer.

17. An electrochromic display comprising:
a first substrate
a second substrate
a plurality of pixels each comprising
a pixel electrode disposed on the first substrate
a counter electrode disposed on the second substrate
an electrochromic layer disposed between the pixel electrode and the counter electrode
an electrolytic layer disposed between the pixel electrode and the counter electrode
a reflector for the pixels disposed on the first substrate, wherein the pixel electrode is made of any one of Al and Ag.

* * * * *